A. C. BOYD.
BRAKE MECHANISM FOR MOTOR VEHICLES.
APPLICATION FILED NOV. 12, 1913.

1,146,918.

Patented July 20, 1915.

Witnesses
G. M. Copenhaver.
Harry F. Ruth

Inventor
Austin C. Boyd
By Wm. H. Bates Attorneys

UNITED STATES PATENT OFFICE.

AUSTIN C. BOYD, OF ROSLYN, MARYLAND.

BRAKE MECHANISM FOR MOTOR-VEHICLES.

1,146,918.  Specification of Letters Patent.  Patented July 20, 1915.

Application filed November 12, 1913. Serial No. 800,558.

*To all whom it may concern:*

Be it known that I, AUSTIN C. BOYD, a citizen of the United States, residing at Roslyn, in the county of Baltimore and State of Maryland, have invented certain new and useful Improvements in Brake Mechanism for Motor-Vehicles, of which the following is a specification.

This invention relates to brake mechanism for motor vehicles, and its primary object is to provide motor vehicles with improved brake mechanism applied to the front axle of the vehicle to insure a quick and reliable application of the brakes and a resultant stoppage of the forward movement of the vehicle within the minimum distance, thus materially lessening the liability of accidents by collision with pedestrians or with other vehicles.

The invention embodies the utilization of band brakes on the front axle of automobiles in addition to rear axle brakes, the forward brake mechanism being operatively connected to the rear axle brakes.

The invention includes the employment of connecting rods equipped with universal joints between the brake-rods and brake bands, adapting the front axle brakes to be operated without impeding the free movement of the front wheels in steering.

The construction of the improved brake mechanism will be fully described hereinafter in connection with the accompanying drawings which form a part of this specification and its features of novelty will be set forth and defined in the appended claims.

Figure 1:
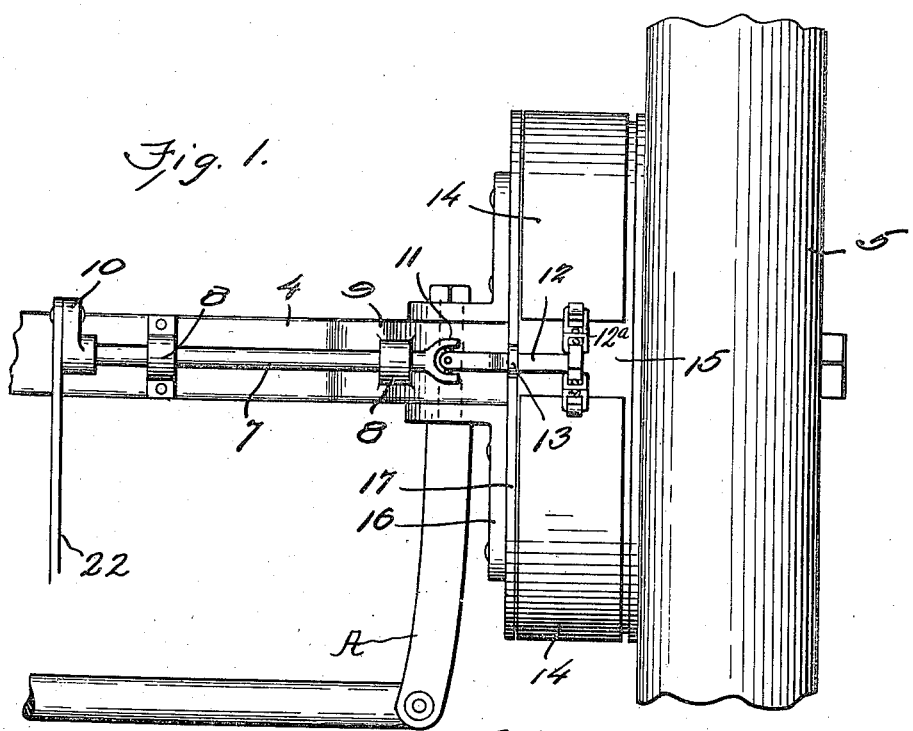
Figure 2:
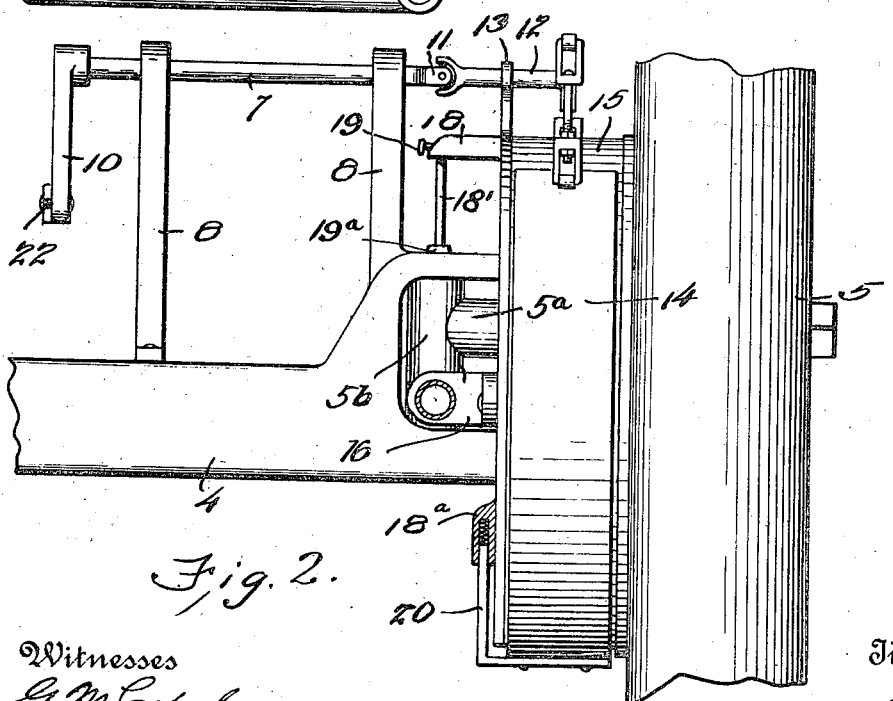

In the drawing—Figure 1 is a detail top plan view on an enlarged scale of one end of the front axle of the vehicle with parts connected thereto, and Fig. 2 is a detail front elevation of the mechanism shown in Fig. 1.

The axle 4 supports front wheels 5 on a spindle $5^a$, formed integral with a vertical spindle $5^b$ mounted in one forked end of the front axle 4. Above and parallel with the front axle 4, is a sectional shaft 7, which is rotatably mounted in upstanding bearing brackets 8, supported on said axle 4; and on the inner end of each section of said sectional shaft 7 is mounted a crank arm 10. The outer end of each section of the shaft 7 is formed with a fork 11, in the axis of the spindle $5^b$, for attachment to the inner end of a coupling rod 12 supported in an upstanding bearing ear 13 of a drum plate 17, said coupling rod 12 being connected at its outer end as shown at $12^a$ to a brake band 14, coöperating with a brake drum 15 on the wheel 5.

Secured to the vertical spindle $5^b$ by means of the angle arm A are L-shaped brackets 16 which support the drum plate 17. Upon the plate 17 are bosses 18 and $18^a$, provided with sockets, and in the socket of the upper boss is secured one end of a rod 18′, by means of a set screw 19, the other end of said rod being loosely mounted in a boss $19^a$ on the axle 4, above the spindle $5^b$. The second or lower boss $18^a$ is deeper and provided with a spring pressed L-shaped rod 20 secured to the bottom of the brake band and having one end slidably engaged in said lower boss and bearing against said spring. Members 18 and 18′ serve to brace the plate 17 while members $18^a$ and 20 serve as a means to prevent rattling of the band and also as an anchoring means in conjunction with lug 13. A link 22 has suitable connection with the crank arm 10, and the brake pedal (not shown).

The improvement affords efficient means for quickly stopping a motor vehicle, and hence for reducing to the minimum the liability of accidents by collision.

The details of construction may be varied or modified within the scope and purview of the claims, and it will therefore be understood that the invention is not restricted to the exact construction herein shown and described.

Having fully described my invention, what I claim as new and desire to secure by Letters Patent is:—

1. A device for controlling brakes fitted to the steering wheels of a vehicle comprising in combination with an axle and a wheel-carrying spindle operatively connected thereto; a drum carried by said wheel; angle brackets secured to said spindle; a drum plate carried by said brackets having a lug operatively supporting a section of the brake band operating shaft; and brackets on the axle operatively supporting the second shaft section.

2. A device for controlling brakes fitted to the steering wheels of a vehicle comprising in combination with an axle, and a wheel-carrying spindle operatively connected thereto; a drum carried by said wheel; a brake band encircling said drum; angle brackets secured to the wheel spindle by means of an angle arm; a drum plate carried by said brackets having means for supporting the brake band, said means comprising a spring pressed rod attached to the band and a lug for supporting a section of a brake-band operating shaft; and an auxiliary means for bracing said drum plate.

In testimony whereof I affix my signature in presence of two witnesses.

AUSTIN C. BOYD.

Witnesses:
JAMES HEWES,
JAS. A. CLARK.